United States Patent [19]
Nguyen et al.

[11] Patent Number: 5,708,129
[45] Date of Patent: Jan. 13, 1998

[54] DIE ATTACH ADHESIVE WITH REDUCED RESIN BLEED

[75] Inventors: My N. Nguyen, Poway; Kim-Chi Le, San Diego, both of Calif.

[73] Assignee: Johnson Matthey, Inc., Vally Forge, Pa.

[21] Appl. No.: 680,705

[22] Filed: Jul. 17, 1996

Related U.S. Application Data

[63] Continuation of Ser. No. 430,427, Apr. 28, 1995, abandoned.

[51] Int. Cl.$^6$ .................................................. C08G 63/44
[52] U.S. Cl. .................... 528/362; 252/572; 252/514; 428/208; 528/88; 528/92; 528/99; 528/363; 528/422
[58] Field of Search ............................ 252/512, 514; 428/208; 528/88, 92, 99, 362, 363, 422

[56] References Cited

U.S. PATENT DOCUMENTS

| | | | |
|---|---|---|---|
| 5,150,195 | 9/1992 | Nguyen | 357/72 |
| 5,155,066 | 10/1992 | Nguyen | 437/209 |
| 5,195,299 | 3/1993 | Nguyen | 53/428 |
| 5,250,600 | 10/1993 | Nguyen et al. | 524/377 |
| 5,371,178 | 12/1994 | Nguyen | 528/362 |
| 5,386,000 | 1/1995 | Nguyen | 528/362 |
| 5,399,907 | 3/1995 | Nguyen | 257/783 |

FOREIGN PATENT DOCUMENTS

WO 830310 of 0000 WIPO.

OTHER PUBLICATIONS

J.E. Ireland, "Epoxy Bleedout in Ceramic Chip Carriers", Feb. 1982, *International J. Hybrid.*

M.L. White, "The Removal of Die Bond Epoxy Bleed material by Oxygen Plasma", 32nd ECC Conti May 10–12, 1982, San Diego, California, pp. 262–265.

M.R. Marks, et al., "An experimental study of die attach polymer bleedout in ceramic packages", (1994) *Thin Solid Films* vol. 252 (1994) pp. 54–60.

Michael R. Marks et al., "An Experimental Study of Die Attach Polymer Bleedout in Ceramic Packages", *Thin Solid Films*, 1994, pp. 54–60.

J.E. Ireland, "Epoxy Bleedout in Ceramic Chip Carriers", Feb. 1982, *International J. Hybrid*, 4 pages.

M.L. White, "The Removal of Die Bond Epoxy Bleed Material by Oxygen Plasma", 32nd ECC Conti May 10–12, 1982, San Diego, California, pp. 262–265.

P.G. de Gennes, "The Dynamic of Wetting", pp. 173–179.

"Describing the System", *Discover*, May 1994, pp. 2–1 to 2–5.

"Forcefields", *Discover*, May 1994, pp. 3–1 to 3–9.

Lieng-Huang Lee, "Roles of Molecular Interactions in Adhesion, Adsorption, Contact Angle and Wettability", presented to the American Chemical Society Symposium on Adhesion, Contact Angle and Wettability, San Francisco, California, Apr. 1992, pp. 583–634.

*Primary Examiner*—Shelley A. Dodson
*Attorney, Agent, or Firm*—Christie, Parker & Hale, LLP

[57] ABSTRACT

Described is a method of reducing resin bleed of a cyanate ester-containing die attach adhesive produced by curing a liquid resin system that contains cyanate ester monomer or mixtures that include cyanate ester monomer by adding an additive comprising at least one alkylene aromatic compound and curing the liquid resin system with the alkylene aromatic compound. Also disclosed is a die attach adhesive that comprises a resin system with an alkylene aromatic compound.

10 Claims, No Drawings

DIE ATTACH ADHESIVE WITH REDUCED RESIN BLEED

CROSS-REFERENCE TO RELATED APPLICATION

This is a continuation of application Ser. No. 08/430,427, filed Apr. 28, 1995 now abandoned.

BACKGROUND OF THE INVENTION

The present invention relates to the field of die attach adhesives and, more particularly, die attach adhesives that contain cyanate ester. Cyanate ester-containing die attach adhesives are especially useful in the electronics industry for bonding semiconductor chips, also known as "dies," to substrates.

An advantage of cyanate ester-containing die attach adhesives is the ability to be cured rapidly, e.g., less than five minutes at 200° C. A discussion of cyanate ester-containing die attach adhesives appears in U.S. Pat. Nos. 5,150,195, 5,195,299, 5,155,066, 5,250,600, 5,399,907, 5,371,178 and 5,386,000, the disclosures of which are hereby expressly incorporated by reference.

Die attach polymer materials have gained increasing popularity, in part for their ability to accommodate larger die sizes and to facilitate processing at lower temperatures. However, a problem which sometimes occurs results from "bleedout", also referred to as "resin bleed", or separation of the resin vehicle from the polymer adhesive. This problem is discussed in detail in an article entitled "An Experimental Study of Die Attach Polymer Bleedout in Ceramic Packages" by Michael R. Marks, et al. which was published in *Thin Solid Films*, vol. 252, p. 54–60 in 1994. As indicated in the article, in severe bleedout conditions, the resin wets the entire substrate to which the die is to be attached and may succeed in "wicking up" the ceramic sidewalls and contaminate wire bonding metalization. This may result in weak wire bondings by virtue of acting as an interdiffusional barrier at the joints. The article by Marks, et al. suggests two methods to eliminate bleedout: surface energy reduction of the gold plating (on the substrate) or improvement in the cohesiveness of the polymer die attach material. The author suggests that bleedout may be eliminated by increasing the cohesiveness of the polymer matrix by increasing the intermolecular attractive energy through the presence of functional groups with high dipole moments in high concentrations. In particular, it is suggested that phenol-cured epoxy, polyamide and polycyanate were found to have good bleedout resistance which was attributed to high dipole moments of epoxide and hydroxyl in phenol-cured epoxy.

The present invention provides an alternative method to reduce resin bleed or bleedout of the die attach adhesive which is particularly applicable to cyanate-ester containing die attach adhesives, and to a novel die attach adhesive exhibiting reduced resin bleed.

SUMMARY OF THE INVENTION

In accordance with the present invention there is provided a method of reducing resin bleed of a cyanate ester-containing die attach adhesive produced by curing a liquid resin system that contains cyanate ester monomer or mixtures that include cyanate ester monomer. The method comprises adding an additive comprising at least one alkylene aromatic compound and curing the liquid resin system with the alkylene aromatic compound to produce a die attach adhesive that exhibits reduced resin bleed. Preferably, the amount of additive comprises about 1–20 wt. % of the combined addition and liquid resin system. The preferred additives comprise at least one of α-methyl styrene, trimethyl styrene, styrene, vinyl toluene and allylphenol. The liquid resin system may further comprise a metal curing catalyst, preferably copper acetyl acetate in a solution with nonlyphenol. A preferred die attach adhesive further comprises silver in an amount of up to about 90 wt. %.

A die attach adhesive in accordance with the invention comprises a cured resin system that comprises cyanate ester and at least one alkylene aromatic compound, preferably from the group described above, and which may contain a metal curing catalyst and, advantageously, silver in an amount up to about 90 wt. %.

DETAILED DESCRIPTION

It has been determined that the addition of certain group of chemical structures to a liquid resin system, such as a liquid resin system containing cyanate ester monomer, and mixtures that include cyanate ester monomer, will reduce the spreading of the adhesive on various substrates. As indicated previously, the spreading of the adhesive is variously referred to as "bleedout" or, "resin bleed." In particular, resin bleed may be reduced by the addition of one or more alkylene aromatics into the liquid resin system. The addition is made so that the additive is present during curing. Alkylene aromatics are short molecular structures containing at least one benzene ring.

To illustrate the invention and the improvements obtained thereby, a number of samples were prepared and tested as described below.

Cyanate ester monomers are available commercially from different sources, one of which is a product known as "Arocy L-10" available from Ciba Gergy, Louisville, Ky. This material is a cyanate ester in the form of a liquid dicyanate monomer.

In one series of tests, mixtures of Arocy L-10 and allylphenol were prepared in weight ratios of L-10 to allylphenol of 50:50; 85:15; 80:20; 75:25; and 70:30; and 100:00, respectively, and identified as samples of A, B, C, D, E and F. These mixtures were all stable without the addition of curing catalyst or silver. To samples A, C, D and E, 80% silver was added. Sample F which is a mixture of Arocy L-10 and 80% silver, without allylphenol or any other alkylene aromatic, was used for comparison. During mixing, at about 50° C. the samples became warm and the viscosity increased to approximately three to four times the viscosity of sample F, namely to a value and a range of 15 to 40 Pa.s. Thereafter, the samples were cured on a heater block at 150° C. for two minutes.

Table 1 below reports the results and observations of resin bleed and flash off for the six samples A through F discussed above. The resin bleed is described for sample F as 10 mils and the description of resin bleed for the remaining sample, also given in mils, is much less. Flash off refers to some monomer evaporation during high temperature cure. Additions of alkylphenol in samples D and E increased the rate of cure significantly and therefore reduced the monomer "flash off."

TABLE 1

|  | A | B | C | D | E | F |
|---|---|---|---|---|---|---|
| Resin Bleed (mils) | 1 | 7 | 4 | 3 | 2 | 10 |
| Flash off | no | some | little | no | no | Yes |
| Viscosity ($40^{s-1}$) | — | — | — | 35 | 37 | 8 |
| Pot life (double viscosity) | — | — | — | 4 hrs | 3 hrs. | 10 hrs. |

Another series of samples of Arocy L-10 and α-methyl styrene with copper acetyl acetonate in a solution of nolyphenol were prepared in the proportions indicated in Table 2 below. The resin bleed for these specimens was measured following curing on a hot plate at 150° C. for ten minutes. In Table 2 the values given for the samples are ratios of the components indicated to each other. Note that in this series, sample J has no alkylene aromatic addition.

TABLE 2

|  | G | H | I | J | K |
|---|---|---|---|---|---|
| L-10 | 100 | 100 | 100 | 100 | 100 |
| α-methyl styrene | 5 | 10 | 20 | 0 | 1 |
| CuAcAc solution in nonlyphenol | 2 | 2 | 2 | 2 | 2 |

Resin bleed for the samples described in Table 2 was determined by placing one drop of the sample liquid on a gold plated ceramic substrate with the diameter of the drop measured before and after curing. Table 3 below reports the ratio of the diameter after curing to the diameter before curing for the samples described in Table 2. It is evident that the lower the ratio number, the less the resin bleed that occurs as a result of curing. It is noted that the addition of an alkylene aromatic, e.g., α-methyl styrene as in Samples G, H, I, and K results in significantly less resin bleed than Sample J which does not contain an alkylene aromatic compound.

TABLE 3

|  | G | H | I | J | K |
|---|---|---|---|---|---|
| Diameter after cure to Diameter before cure | 6 | 5 | 5 | 10 | 6 |

Since the addition of silver may be important component of a die attach adhesive, tests were conducted to determine the effect of silver additions on the cyanate ester-containing liquid resin system. Accordingly, mixtures of the samples indicated in Table 2 with the addition of 87% silver were made. After curing on a hot plate at 150° C. for 10 minutes, no resin bleed was observed for Ag-containing mixtures of samples G, H, I, K and sample J without alkylene aromatic adhesive showed a resin bleed.

The effect on adhesion of the alkylene aromatic compound was also evaluated. Table 4 below illustrates this effect for the samples described. In Table 4 the wt. % of the alkylene aromatic compound, α methylstyrene, is shown corresponding to the samples G, H, I, and K, of Table 2, with silver, and the sample J, also with silver but without alkylene aromatic. It is evident that at the adhesion of samples G and K correspond to the adhesion achieved with sample J. These samples contain less additive but have better adhesion than samples H and I with a larger amount of additive.

In addition, samples with α methyl styrene added showed significant increase in pot life at room temperature.

TABLE 4

| Effect on Adhesion | G | H | I | J | K |
|---|---|---|---|---|---|
| % α MS | 5 | 10 | 20 | 0 | 1 |
| Adhesion (lbs) | >800 | 476 | 0.4 | >800 | >800 |
| Electrical resistance (215° C. + 320° C.) | 3.7 mΩ | — | 7.5 mΩ | 5.0 mΩ | 5.0 mΩ |
| Pot life (double viscosity) | 40 hrs. | — | 96 hrs. | 12 hrs. | 16 hrs. |

Table 5 below describes another series of samples which have been prepared and tested. In these samples, various amounts of α-methyl styrene, trimethyl styrene, styrene, vinyl toluene and allylphenol are shown as additives to Arocy L-10, with copper catalysts.

TABLE 5

|  | L | M | N | O | P | Q |
|---|---|---|---|---|---|---|
| L-10 | 10 | 10 | 10 | 10 | 10 | 10 |
| αMS |  | 0.5 |  |  |  |  |
| Trimethyl Styrene |  |  | 0.5 |  |  |  |
| Styrene |  |  |  | 0.5 |  |  |
| Vinyl Toluene |  |  |  |  | 0.5 |  |
| Allylphenol |  |  |  |  |  | 0.5 |
| Cu Catalysts | 0.2 | 0.2 | 0.2 | 0.2 | 0.2 | 0.2 |

Resin bleed for the samples shown in Table 5 was measured by applying a drop of the liquid mixture on a gold plated ceramic substrate and heated on a hot plate at 150° C. for 10 minutes. The degree of spreading was measured before and after cure and resulted in the ratios set forth in Table 6. The ratios in Table 6, express the ratio of the diameter after cure to the diameter before curing and, once again, it is seen that each of the samples with an alkylene aromatic exhibited reduced resin bleed.

TABLE 6

|  | L | M | N | O | P | Q |
|---|---|---|---|---|---|---|
| Diameter after cure to Diameter before cure | 10 | 5 | 8 | 5 | 5 | 4 |

It is apparent from the foregoing that various modifications may be made without departing from the invention. Accordingly, the scope of the invention should be limited only by the appended claim.

What is claimed is:

1. A method of reducing resin bleed of a cyanate ester-containing die attach adhesive produced by curing a liquid resin system containing cyanate ester monomer or mixtures including cyanate ester monomer, comprising adding an additive comprising at least one alkylene aromatic compound to the liquid resin system and curing the alkylene aromatic compound-containing liquid resin system to produce a cured die attach adhesive.

2. A method of claim 1 wherein the additive is about 1 to 20 wt. % of the combined liquid resin system and additive.

3. A method of claim 1 wherein the alkylene aromatic compound comprises at least one from the group consisting of α-methyl styrene, styrene, trimethyl styrene, vinyl toluene and allylphenol.

4. A method according to claim 3 wherein the liquid resin system further comprises a metal curing catalyst.

5. A method according to claim 4 wherein the metal curing catalyst comprises copper acetyl acetonate in a solution with nonlyphenol.

6. A method according to claim 1 wherein the liquid resin system further comprises silver in an amount up to about 90 wt. %.

7. A die attach adhesive comprising a cured resin system comprising cyanate ester and at least one alkylene aromatic compound from the group consisting of α-methyl styrene, trimethyl styrene, styrene, vinyl toluene and allylphenol.

8. A die attach adhesive according to claim 7 further comprising a metal curing catalyst.

9. A die attach adhesive according to claim 8 wherein the metal curing catalyst comprises copper acetonate acetate.

10. A die attach adhesive according to claim 7 further comprising silver in an amount up to about 90 wt. %.

* * * * *